US010650472B2

(12) United States Patent
Brinkman et al.

(10) Patent No.: US 10,650,472 B2
(45) Date of Patent: *May 12, 2020

(54) SINGLE USE ACCOUNT POOL PROCESSING SYSTEM AND METHOD

(71) Applicant: Visa International Service Association, San Francisco, CA (US)

(72) Inventors: Josie Brinkman, Leesburg, VA (US); Dave Meaney, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/855,740

(22) Filed: Dec. 27, 2017

(65) Prior Publication Data

US 2018/0122017 A1 May 3, 2018

Related U.S. Application Data

(63) Continuation of application No. 14/575,882, filed on Dec. 18, 2014, now Pat. No. 9,892,466.

(60) Provisional application No. 61/918,592, filed on Dec. 19, 2013.

(51) Int. Cl.
G06Q 20/10 (2012.01)
G06Q 40/00 (2012.01)

(52) U.S. Cl.
CPC ................... *G06Q 40/12* (2013.12)

(58) Field of Classification Search
None
See application file for complete search history.

(56) References Cited

U.S. PATENT DOCUMENTS

| 8,266,058 | B1 | 9/2012 | Anderson |
| 8,719,158 | B2 | 5/2014 | Todd |
| 8,751,376 | B1 | 6/2014 | Wilkes |
| 9,892,466 | B2 * | 2/2018 | Brinkman .............. G06Q 40/12 |
| 2003/0233334 | A1 * | 12/2003 | Smith .................... G06Q 20/04 705/75 |

(Continued)

OTHER PUBLICATIONS

U.S. Appl. No. 14/575,882, "Non-Final Office Action", dated Mar. 9, 2017, 15 pages.

(Continued)

*Primary Examiner* — Paul Danneman
(74) *Attorney, Agent, or Firm* — Kilpatrick Townsend & Stockton LLP

(57) ABSTRACT

Embodiments are directed to systems, apparatus, and methods for account pool processing. In some embodiments, a server computer can store account information for a first pool of accounts and a second pool of accounts. The server computer can receive a payment request message from a buyer that identifies a payment amount and a supplier, and can determine that the payment amount corresponds to the first or second pool of accounts. If the payment amount corresponds to the first pool of accounts, the server computer can select an account from the first pool of accounts, and can transmit account information for the selected account to the supplier. If the payment amount corresponds to the second pool of accounts, the server computer can select an account from the second pool of accounts, and can transmit account information for the selected account to the supplier.

20 Claims, 6 Drawing Sheets

(56) References Cited

U.S. PATENT DOCUMENTS

| | | |
|---|---|---|
| 2011/0055079 A1 | 3/2011 | Meaney |
| 2011/0218849 A1 | 9/2011 | Rutigliano et al. |
| 2012/0330744 A1 | 12/2012 | Aissa |
| 2015/0178854 A1 | 6/2015 | Brinkman et al. |

OTHER PUBLICATIONS

U.S. Appl. No. 14/575,882 , "Notice of Allowance", dated Oct. 4, 2017, 12 pages.

U.S. Appl. No. 14/575,882 , "Supplemental Notice of Allowance", dated Oct. 26, 2017, 5 pages.

\* cited by examiner

| Account Pool Data Table 300 ||||
|---|---|---|---|
| Buyer ID 302(a) | Value Limit 302(b) | Account ID 302(c) | Availability 302(d) |
| A | $500 | 1234567800000000 | In-Use |
| | | 1234567800000001 | In-Use |
| | | 1234567800000002 | In-Use |
| | | 1234567800000003 | In-Use |
| | | 1234567800000004 | Available |
| | | 1234567800000005 | Available |
| | $1,000 | 1234567800000006 | In-Use |
| | | 1234567800000007 | In-Use |
| | | 1234567800000008 | Available |
| | | 1234567800000009 | Available |
| | | 1234567800000010 | Available |
| | $1,500 | 1234567800000011 | In-Use |
| | | 1234567800000012 | Available |
| | | 1234567800000013 | Available |
| | | 1234567800000014 | Available |
| B | $5,000 | 1234567800000015 | In-Use |
| | | 1234567800000016 | In-Use |
| | | 1234567800000017 | In-Use |
| | $25,000 | 1234567800000018 | In-Use |
| | | 1234567800000019 | In-Use |
| | | 1234567800000020 | In-Use |
| | | 1234567800000021 | In-Use |
| | | 1234567800000022 | Available |
| | $100,000 | 1234567800000023 | In-Use |
| | | 1234567800000024 | Available |
| C | $500 | 1234567800000025 | In-Use |
| | | 1234567800000026 | In-Use |
| | | 1234567800000027 | In-Use |
| | | 1234567800000028 | In-Use |
| | $750 | 1234567800000029 | Available |
| | | 1234567800000030 | Available |
| | $1,000 | 1234567800000031 | In-Use |
| | | 1234567800000032 | Available |

*FIG. 3*

SINGLE USE ACCOUNT POOL PROCESSING SYSTEM AND METHOD

CROSS-REFERENCES TO RELATED APPLICATIONS

This application is a continuation of U.S. patent application Ser. No. 14/575,882, filed Dec. 18, 2014 which claims priority to U.S. Provisional Application No. 61/918,592 filed Dec. 19, 2013, the entire contents of both applications are herein incorporated by reference for all purposes.

BACKGROUND

Business entities (e.g., buyers) often rely on various goods and services supplied by other business entities (e.g., suppliers) to conduct their business. For example, a manufacturer of goods may need to purchase raw materials, parts, and machinery from various suppliers. Such manufacturers may also need to purchase delivery services from third party delivery suppliers to ensure that their manufactured goods reach consumers. Such purchases may result in the buyer incurring debt with multiple suppliers that may need to be paid periodically or at particular times depending on the requirements of each supplier.

To facilitate the payment of debt to multiple suppliers, accounts payable systems have been developed. As an example, an accounts payable system may utilize accounts issued to a buyer that can be used to make payments to the buyer's suppliers. Upon receipt of instructions from the buyer to pay debt owed to multiple suppliers, the accounts payable system can send account information (e.g., account numbers, expiration dates, etc.) to each supplier which may then initiate the transactions using the account information.

Although existing accounts payable systems can provide advantages such as facilitating the payment of debt owed to multiple suppliers in a convenient and efficient manner, such systems may also introduce a number of disadvantages. For example, the account information sent to a supplier may correspond to an account having a credit limit significantly higher than that needed to cover the payment amount. Thus, there may be risks associated with transmitting the account information to suppliers. Such risks may include fraud by unscrupulous suppliers, or suppliers inadvertently processing the transaction for an amount higher than that owed by the buyer. Additionally, since suppliers may store such sensitive information at least temporarily, there are opportunities for hackers or other fraudsters to gain unauthorized access to the account information.

Various controls have been implemented in an attempt to alleviate such problems with existing accounts payable systems. For example, an account credit limit can be adjusted prior to transmitting the account information to the supplier. As another example, an "authorization match" process can occur where a payment amount included in an authorization request message transmitted from the supplier to the account issuer can be compared to the payment amount included in the payment request received from the buyer. In these instances, however, the controls are generally implemented by a payment processing network with the ability to modify credit limits, review authorization messages, and decline transactions on behalf of account issuers. Thus, the controls are not available to suppliers with accounts issued by issuers that use payment processing networks without such controls or self-processing issuers that do not use payment processing networks to process their transactions. Moreover, credit limit adjustments and authorization match processes may undesirably consume computational processing resources and may increase the time required for accounts payable processing and subsequent transaction authorization.

Embodiments of the invention address these and other problems.

BRIEF SUMMARY

Embodiments of the invention are directed to systems, apparatus, and methods for account pool processing.

One embodiment of the invention is directed to a method. The method may comprise storing, by a server computer, account information for a first pool of accounts and a second pool of accounts. The server computer can receive a payment request message from a buyer that identifies a payment amount and a supplier, and can determine that the payment amount corresponds to the first pool of accounts or the second pool of accounts. If the payment amount corresponds to the first pool of accounts, the server computer can select an account from the first pool of accounts, and can transmit account information for the account in the first pool of accounts to the supplier. If the payment amount corresponds to the second pool of accounts, the server computer can select an account from the second pool of accounts, and can transmit account information for the account in the second pool of accounts to the supplier.

Another embodiment of the invention is directed to a server computer that may comprise a processor and a non-transitory computer-readable medium coupled to the processor. The non-transitory computer-readable medium can include code executable by the processor for performing a method. The method may comprise storing account information for a first pool of accounts and a second pool of accounts, receiving a payment request message from a buyer that identifies a payment amount and a supplier, and determining that the payment amount corresponds to the first pool of accounts or the second pool of accounts. If the payment amount corresponds to the first pool of accounts, the method may further comprise selecting an account from the first pool of accounts, and transmitting account information for the account in the first pool of accounts to the supplier. If the payment amount corresponds to the second pool of accounts, the method may further comprise selecting an account from the second pool of accounts, and transmitting account information for the account in the second pool of accounts to the supplier.

Another embodiments of the invention is directed to a method. The method may comprise transmitting, by a supplier computer, an invoice to a buyer that identifies a payment amount and a supplier operating the supplier computer, wherein the buyer can transmit a payment request message identifying the payment amount and supplier to a server computer that stores account information for a first pool of accounts and a second pool of accounts, and wherein the server computer can determine that the payment amount corresponds to the first pool of accounts or the second pool of accounts. If the payment amount corresponds to the first pool of accounts, the server computer can select an account from the first pool of accounts, and transmit account information for the account in the first pool of accounts to the supplier computer. If the payment amount corresponds to the second pool of accounts, the server computer can select an account from the second pool of accounts, and transmit account information for the account in the second pool of accounts to the supplier computer. The supplier computer can receive the account information for the selected account from the server computer, and can transmit an authorization request message to an issuer of the selected account via a payment processing network configured to process debit and credit card transactions. The authorization request message can include the account information for the selected account and the payment amount. The supplier computer can receive an authorization response message from the issuer of the selected account via the payment processing network, wherein the authorization response message indicates whether the issuer authorizes a transfer of the payment amount from the selected account to the supplier.

These and other embodiments of the invention are described in detail below.

BRIEF DESCRIPTION OF THE DRAWINGS

FIG. 3 illustrates an exemplary data table containing account pool data in accordance with some embodiments.

DEFINITIONS

Figure 1:
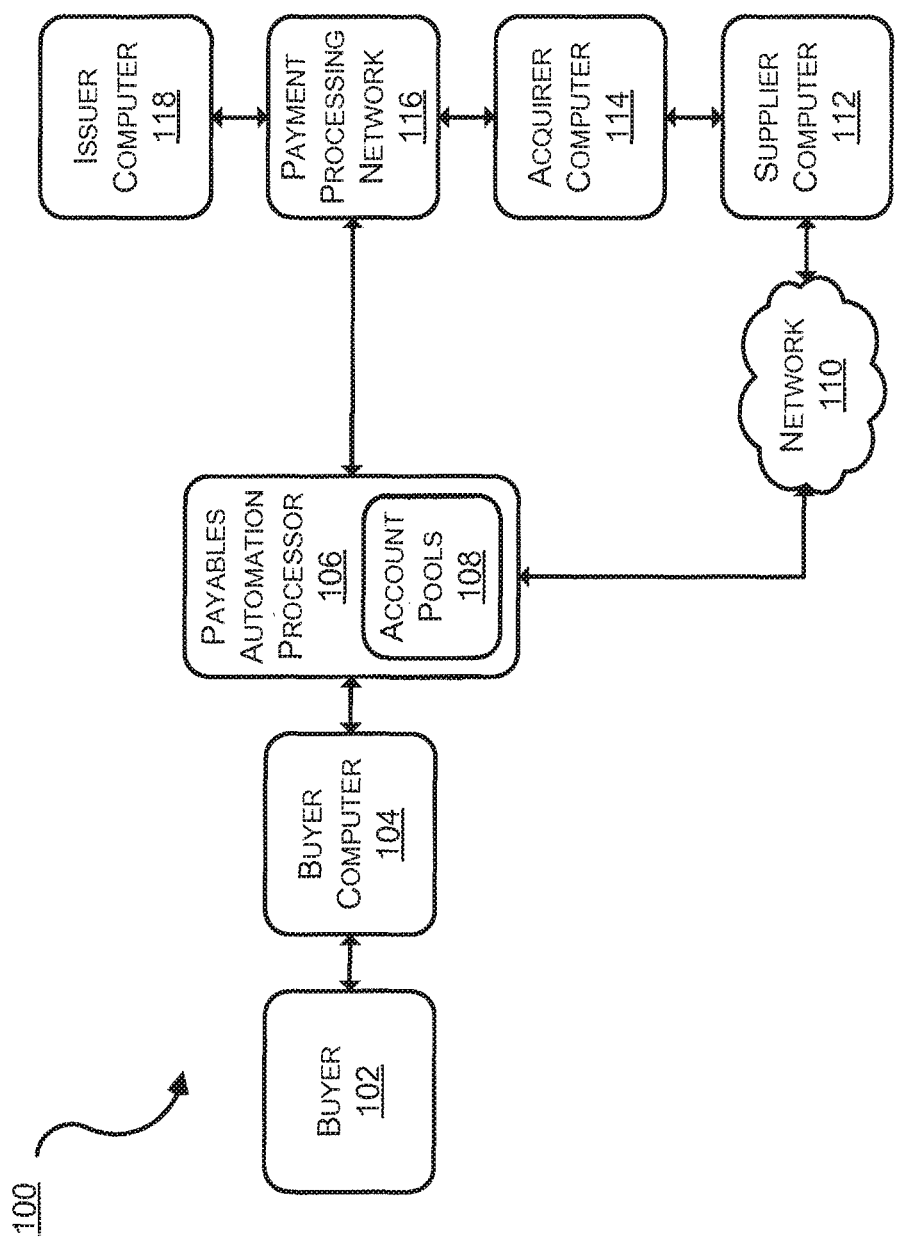
FIG. 1 illustrates a block diagram of an exemplary payment processing system in accordance with some embodiments.

Prior to further describing embodiments of the invention, a description of some terms may be helpful in understanding embodiments of the invention.

A "server computer" may be any suitable computer that can provide communications to other computers and receive communications from other computers. A server computer may include a computer or cluster of computers. For example, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

A "processor" may include hardware within a server computer (or other computing device) that carries out instructions embodied as code in a computer-readable medium (e.g., a non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

A "pool of accounts" may be any suitable aggregation of accounts. Any suitable accounts can be aggregated into account pools including, but not limited to, credit card accounts, debit card accounts, prepaid card accounts, gift card accounts, and the like. In some embodiments, accounts in a pool of accounts can include "virtual accounts" not associated with a physical payment device (e.g., a physical card). One or more of the accounts in a pool of accounts can alternatively be associated with a physical payment device in some embodiments. In some embodiments, a pool of accounts can include accounts having a shared attribute such as, by way of example, a shared "value limit" which can include a credit limit, account balance, or the like.

A "payment request message" may be any suitable message requesting that a payment be made to a payee on behalf of a payor. In some embodiments, a payment request message can be in the form of an "accounts payable instruction file" transmitted to an accounts payable processor and including instructions to make payments to a plurality of payees on behalf of the payor. In some embodiments, a payment request message can be sent by a buyer and can include instructions to make a payment to a supplier on behalf of the buyer.

"Account information" may be any suitable information describing an account. Such suitable information can include, but is not limited to, an account number (e.g., a primary account number "PAN"), expiration date, CVV code, billing address information (e.g., a billing ZIP code), account holder name, account holder phone number, and the like.

An "authorization request message" may be an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a consumer payment device or payment account. An authorization request message may also comprise additional data elements corresponding to identification information including, by way of example only: a service code, a CVV/iCVV (card verification value), a dCVV (dynamic card verification value), a cryptogram (e.g., a unique cryptographic value for the transaction), an expiration date, etc. An authorization request message may also comprise transaction information, such as any information associated with a current transaction, such as the transaction amount, merchant identifier (e.g., MVV), merchant location, merchant category code, etc., as well as any other information that may be utilized in determining whether to authorize a transaction.

An "authorization response message" may be an electronic message reply to an authorization request message generated by an issuing financial institution or a payment processing network. An authorization response message according to some embodiments may comply with ISO 8583. An authorization response message may include, by way of example only, one or more of the following status indicators: Approval—transaction was approved; Decline—transaction was not approved; or Call Center—response pending more information, merchant must call the toll-free authorization phone number. The authorization may also include "identification information" as described above. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As described below, in some embodiments, a payment processing network may generate or forward the authorization response message to a gateway, merchant, or an acquirer of the merchant.

DETAILED DESCRIPTION

Embodiments of the invention are directed to systems, apparatus, and methods for providing account pool processing. A buyer can be issued multiple accounts from an issuer for paying the buyer's suppliers. The buyer's accounts can each have a specified value limit (e.g., a credit limit). The account information for the buyer's accounts can be uploaded to a payables automation processor, which can aggregate the accounts into "account pools" based on their respective value limits. When a payment request message is received from the buyer requesting that a payment be made to a supplier, the payables automation processor can select an available account from the pool of accounts associated with the lowest value limit sufficient to cover the payment amount. If all accounts in the pool are in use, an account can be selected from the pool of accounts associated with the next highest credit limit sufficient to cover the payment amount.

To illustrate, a buyer can register with a payables automation processor. As part of the registration process, the buyer can provide supplier data (e.g., supplier names, telephone numbers, email addresses, etc.) corresponding to the suppliers that provide the buyer with goods and/or services and that the buyer expects to incur debt with in the future. The buyer can be issued multiple accounts (e.g., credit card accounts) having specified credit limits for paying the buyer's suppliers. The accounts can be in the form of virtual accounts not associated with physical payment cards. As part of the registration process, the buyer can upload their issued account information to the payables automation processor. Alternatively, the issuer of the buyer's accounts can provide the account information. The payables automation processor can organize the accounts into pools that each correspond to a particular credit limit. For example, a first pool may include virtual accounts having a $500 credit limit, a second pool may include virtual accounts having a $1,000 credit limit, a third pool may include virtual accounts having a $1,500 credit limit, and so forth.

The buyer may subsequently send the payables automation processor a payment request message (e.g., using a buyer computer) that informs the payables automation processor of the suppliers that are to receive payments and the amount of each payment. To initiate a given payment, the payables automation processor can select an account from the account pool corresponding to the lowest credit limit sufficient to cover the payment. For example, in this illustration, if the payment request message includes an instruction to pay a particular supplier $200, the payables automation system can select a virtual account from the pool of accounts having a credit limit of $500. Virtual account info corresponding to the account (e.g., the account number, expiration date, etc.) can then be transmitted by the payables automation system to the supplier which may then process the payment using the virtual account info. In some embodiments, an email including an embedded link (e.g., a hyperlink) can be transmitted to the supplier such that the account information is displayed to the supplier by selecting the embedded link. Upon obtaining the account information, in some embodiments, the supplier may run the transaction as a conventional credit or debit card transaction using a point-of-sale (POS) terminal or a supplier computer running POS software.

As another illustration, the payment request message may include an instruction to pay a supplier $1,200. In response, the payables automation system can select an account from the account pool corresponding to the lowest credit limit sufficient to cover the payment, i.e. from the pool of virtual accounts having a credit limit of $1,500. Virtual account info corresponding to the account can then be transmitted to the supplier for processing of the payment.

As yet another illustration, the payment request message submitted by the buyer may include an instruction to pay a supplier $800. In response, the payables automation system can attempt to select an account from the pool of virtual accounts having a credit limit of $1,000. In some embodiments, the number of virtual accounts in each pool are finite, with each account being usable for paying only one supplier at any given time. Thus, there may be a scenario where all the accounts in a given pool are currently being used to pay other suppliers. For example, in this illustration. there may not be an available virtual account in the pool of accounts having a credit limit of $1,000. In this scenario, the payables automation system can select an account from the pool of accounts having the next highest credit limit. In this illustration, the payables automation system can select an account from the pool of accounts having a credit limit of $1,500 since no accounts having a credit limit of $1,000 are available.

Embodiments of the invention can provide a number of advantages. For example, by selecting a virtual account from a pool of available accounts having the lowest value limit sufficient to cover the payment amount, buyers and issuers can limit their exposure to the various risks associated with unscrupulous suppliers, suppliers inadvertently processing a transaction for an amount higher than that owed by the buyer, and hackers or other fraudsters gaining unauthorized access to account information. In the case of self-processing issuers or issuers that otherwise do not have access to account control features provided by payment processing networks, the reduction in risk exposure can be especially advantageous. Moreover, where existing account controls are available to a particular buyer and/or issuer, computational processing resources required for account value limit adjustments and authorization match processes can be conserved, and accounts payable processing and transaction authorization can be made faster and more efficient.

I. Exemplary Systems

FIG. 1 illustrates a block diagram of an exemplary payment processing system 100 in accordance with some embodiments. Although some of the entities and components in system 100 are depicted as separate, in some instances, one or more of the components may be combined into a single device or location. Similarly, although certain functionality may be described as being performed by a single entity or component within system 100, the functionality may in some instances be performed by multiple components and/or entities. Communication between entities and components may comprise the exchange of data or information using electronic messages and any suitable electronic communication medium and method, as described below.

System 100 may include one or more buyers, buyer computers, payables automation systems, supplier computers, acquirer computers, payment processing networks, issuer computers, and networks. For example, as illustrated in FIG. 1, system 100 can include a buyer 102 operating a buyer computer 104. Buyer 102 can be an individual, an organization such as a business, or any other suitable entity capable of purchasing goods and/or services. For example, buyer 102 may operate buyer computer 102 to purchase goods and/or services from a supplier operating a supplier computer 112. The supplier can be an individual, an organization such as a business, or any other suitable entity that engages in transactions and that can sell goods and/or services to consumers such as buyer 102.

Buyer computer 104 can be one or more computing devices. Suitable computing devices can include, but are not limited to, a server computer, desktop computer, laptop computer, tablet computer, wireless phone, smart phone, personal digital assistant (PDA), and the like. Buyer computer 104 can include an external communication interface (e.g., for communicating with a payables automation gateway 106 or other entity), system memory comprising one or more modules to generate and utilize electronic messages, and a data processor for facilitating financial transactions and the exchange of electronic messages. Supplier computer 112 can be one or more computing devices. Suitable computing devices can include, but are not limited to, a server computer, desktop computer, laptop computer, tablet computer, wireless phone, smart phone, personal digital assistant (PDA), and the like. Supplier computer 112 can include an external communication interface (e.g., for communicating with payables automation processor 106, an acquirer computer 114, or other entity), system memory comprising one or more modules to generate and utilize electronic messages, and a data processor for facilitating financial transactions and the exchange of electronic messages.

Payables automation processor 106 can facilitate account pool processing in accordance with various embodiments of the invention. In some embodiments, payables automation processor 106 can provide accounts payable automation where payments are paid to suppliers on behalf of buyers. Payables automation processor 106 can store or otherwise have access to account pools 108. As described herein, account pools 108 may be any suitable aggregation of accounts including, but not limited to, credit card accounts, debit card accounts, prepaid card accounts, gift card accounts, and the like. In some embodiments, the accounts in account pools 108 can be in the form of "virtual accounts" not associated with physical payment devices. One or more of the accounts in a pool of accounts can alternatively be associated with a physical payment device in some embodiments. In some embodiments, account pools 108 can include accounts having a shared attribute such as a shared "value limit" which can include a credit limit, account balance, or the like. Any suitable number of accounts can be issued to a buyer and aggregated in account pools 108, such as 100, 1,000, 10,000, 100,000, or more accounts. Moreover, account pools 108 can include any suitable number of pools which can individually comprise any suitable number of accounts.

Payables automation processor 106 can include one or more computing devices. Suitable computing devices can include, but are not limited to, a server computer, desktop computer, laptop computer, tablet computer, wireless phone, smart phone, personal digital assistant (PDA), and the like. Payables automation processor 106 can include an external communication interface (e.g., for communicating with buyer computer 104, supplier computer 112, a payment processing network 116, or other entity), system memory comprising one or more modules to generate and utilize electronic messages, and a data processor for facilitating financial transactions and the exchange of electronic messages. In some embodiments, payables automation processor 106 and supplier computer 112 can communicate using a network 110 which may be any suitable communication network such as the Internet, a voice network, and/or a data network. Any suitable communication protocol can be used including, but not limited to, WiFi (IEEE 802.11 family standards), 3G, 4G EDGE, and the like. Exemplary components and functionalities of payables automation processor 106 are described in further detail below with reference to FIG. 2.

Payment processing network 116 can include data processing subsystems, networks, and operations used to support and deliver authorization services, exception file services, and clearing and settlement services. Payment processing network 116 can include one or more computing devices. For example, payment processing network 116 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Payment processing network 116 may include an external communication interface (e.g., for communicating with payables automation processor 106, acquirer computer 114, an issuer computer 118, or other entity), system memory comprising one or more modules to generate and utilize electronic messages, and a data processor for facilitating financial transactions and the exchange of electronic messages. In some embodiments, payables automation processor 106 is located in or otherwise associated with payment processing network 116.

Acquirer computer 114 can be operated by an acquirer. As used herein, an "acquirer" may refer to a business entity (e.g., a commercial bank or financial institution) that has a business relationship with a particular merchant (e.g., a supplier) or similar entity, and that facilitates clearing, settlement, and any other suitable aspect of electronic payment transactions. The acquirer operating acquirer computer 114 may represent, and vouch for, merchants (e.g., suppliers) in electronic payment transactions. Acquirer computer 114 can include one or more computing devices. Suitable computing devices can include, but are not limited to, a server computer, desktop computer, laptop computer, tablet computer, wireless phone, smart phone, personal digital assistant (PDA), and the like. Acquirer computer 114 may include an external communication interface (e.g., for communicating with supplier computer 112, payment processing network 116, or other entity), system memory comprising one or more modules to generate and utilize electronic messages, and a data processor for facilitating financial transactions and the exchange of electronic messages.

Issuer computer 118 can be operated by an issuer. As used herein, an "issuer" may refer to a business entity (e.g., a bank or other financial institution) that maintains financial accounts for consumers and that may issue payment accounts and consumer payment devices (e.g., credit cards, debit cards, and the like) used to access funds of such accounts. Some entities may perform both issuer and acquirer functions. Issuer computer 118 can include one or more computing devices. Suitable computing devices can include, but are not limited to, a server computer, desktop computer, laptop computer, tablet computer, wireless phone, smart phone, personal digital assistant (PDA), and the like. Issuer computer 118 may include an external communication interface (e.g., for communicating with payment processing network 116 or other entity), system memory comprising one or more modules to generate and utilize electronic messages, and a data processor for facilitating financial transactions and the exchange of electronic messages.

Many of the data processing functions and features of some embodiments of the invention may be present in payables automation processor 106. It should be understood, however, that one or more of such functions and features could be present in other components of system 100 in some embodiments, such as buyer computer 104, supplier computer 112, acquirer computer 114, payment processing network 116, issuer computer 118, or other entity.

Buyer computer 104, payables automation processor 106, supplier computer 112, acquirer computer 114, payment processing network 116, and issuer computer 118 may all be in operative communication with each other. For example, as described above, some or all of these components of system 100 can include an external communication interface. As used herein, an "external communication interface" may refer to any hardware and/or software that enables data to be transferred between two or more components of system 100 (e.g., between devices residing at locations such as an issuer, acquirer, merchant, payment processing network, gateway etc.). Some examples of external communication interfaces may include a modem, a network interface (such as an Ethernet card), a communications port, a Personal Computer Memory Card International Association (PCMCIA) slot and card, and the like. Data transferred via an external communications interface may be in the form of signals which may be electrical, electromagnetic, optical, or any other signal capable of being received by the external communications interface (collectively referred to as "electronic signals" or "electronic messages"). These electronic messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable method.

As would be understood by one of ordinary skill in the art, any suitable communications protocol for storing, representing, and transmitting data between components of system 100 may be used. Some examples of such methods may include utilizing predefined and static fields (such as in core TCP/IP protocols); "Field: Value" pairs (e.g., HTTP, HTTPS, FTP, SMTP, POP3, and SIP); an XML based format; and/or Tag-Length-Value format.

A generalized description of an electronic transaction flow using system 100 may be helpful in understanding embodiments of the invention. As described herein, account pools 108 stored at or otherwise accessible to payables automation processor 106 can include accounts issued to buyer 102 and used to pay suppliers. The accounts in account pools 108 can be organized by value limit in some embodiments. As an initial step in an exemplary electronic transaction flow using system 100, buyer 102 can operate buyer computer 104 to transmit a payment request message to payables automation processor 106. The payables automation message can include instructions to initiate a payment to the supplier operating supplier computer 112. As described in further detail below, payables automation processor 106 can select an available account from accounts pools 108 based upon the amount of the instructed payment. Upon selecting an account, account information for the account can be transmitted by payables automation processor 106 to supplier computer 112 by way of network 110.

Using the received account information, the supplier can generate an authorization request message for the payment transaction. For example, the supplier can enter the account information, payment amount, and other information for the transaction into an access device (e.g., a POS terminal). As used herein, an "access device" may include any device that can be used by a supplier to initiate an electronic payment transaction. An access device may be in any suitable form. Exemplary access devices include point of sale (POS) terminals (e.g., mobile or stationary), cellular phones, PDAs, laptop computers, tablet computers, handheld specialized readers, and the like. An access device may use any suitable contact or contactless mode of operation to send or receive date from, or associated with, a payment device. In some embodiments, where an access device comprises a POS terminal, any suitable POS terminal may be used and may include a reader, a processor, and a computer-readable medium. Exemplary readers can include radio frequency (RF) antennas, optical scanners, bar code readers, QR code readers, and/or magnetic stripe readers to interact with a payment device. In some embodiments, supplier computer 112 may provide access device functionality. For example, supplier computer 112 may be configured to run POS software that emulates a POS terminal, and to provide an interface for the supplier to provide the information for the transaction.

Supplier computer 112 and/or an access device of the supplier can generate the authorization request message including the information for the transaction and can transmit the authorization request message to acquirer computer 114. Upon receipt of the authorization request message, acquirer computer 114 can forward the authorization request message to payment processing network 116.

In general, prior to the occurrence of an electronic payment transaction, payment processing network 116 may have an established protocol with issuers on how the issuer's transactions are to be authorized. In some cases, such as when the transaction amount is below a threshold value, payment processing network 116 may be configured to authorize the transaction based on information that it has about the buyer's account without forwarding the authorization request message to issuer computer 118. In other cases, such as when the transaction amount is above a threshold value, payment processing network 116 may receive the authorization request message via an external communication interface, determine that the issuer of the account selected by payables automation processor 106 is the issuer operating issuer computer 118, and then forward the authorization request message to issuer computer 118 for verification and authorization.

As part of the authorization process, issuer computer 118 can, for example, verify the account, confirm that the account has a sufficient balance or available credit to cover the amount of the transaction, analyze the transaction to identify potential fraud, and/or perform other processes. Once the authorization processes are completed, issuer computer 118 can generate an authorization response message (that may include an indication that the transaction is approved or declined) and transmit this electronic message via its external communication interface to payment processing network 116. In the credit card industry, as one example, the authorization indication typically takes the form of an authorization code, which is five or six alphanumeric characters, by convention. It serves as proof to the supplier and the account holder (e.g., buyer 102) that the issuing bank or payment processing network has authorized the transaction, and may be used by the supplier or buyer as proof of authorization if the issuing bank later disputes the transaction.

Upon receipt of the authorization response message from issuer computer 118, payment processing network 116 may forward the authorization response message via a communication channel to acquirer computer 114, which may in turn transmit the message including the authorization indication to the supplier (e.g., to supplier computer 112 or other access device).

At the end of the day, a normal clearing and settlement process may be conducted by payment processing network 116 in cooperation with issuer computer 118 and acquirer computer 114. A "clearing process" can be a process of exchanging financial details between an acquirer and an issuer across a payment processing network to facilitate posting to a consumer's account and reconciliation of the consumer's settlement position. A "settlement process" can be a process of transferring funds between an acquirer and issuer. In some embodiments, to initiate settlement, acquirer computer 114 can transmit a settlement file including the authorization code for the transaction to payment processing network 116 which can then communication with issuer computer 118 and acquirer computer 114 to facilitate the transfer of funds for the transaction to the supplier.

Buyer 102 may subsequently receive a statement from the issuer that reflects the payment made to the supplier, and can settle the amount owed to the issuer for the transaction. Payables automation processor 106 may also receive reconciliation data from, for example, payment processing network 116. The reconciliation data can include data reflecting the payment made to the supplier, and can be compared with the original payment request message received from buyer computer 104 to confirm that the supplier initiated the transaction for the correct payment amount. Payables automation processor can provide an interface (e.g., a web-based dashboard) in which buyer 102 can access reconciliation reports and other information to confirm that payments made to the buyer's suppliers are executed successfully and for the authorized payment amounts.

Figure 2:
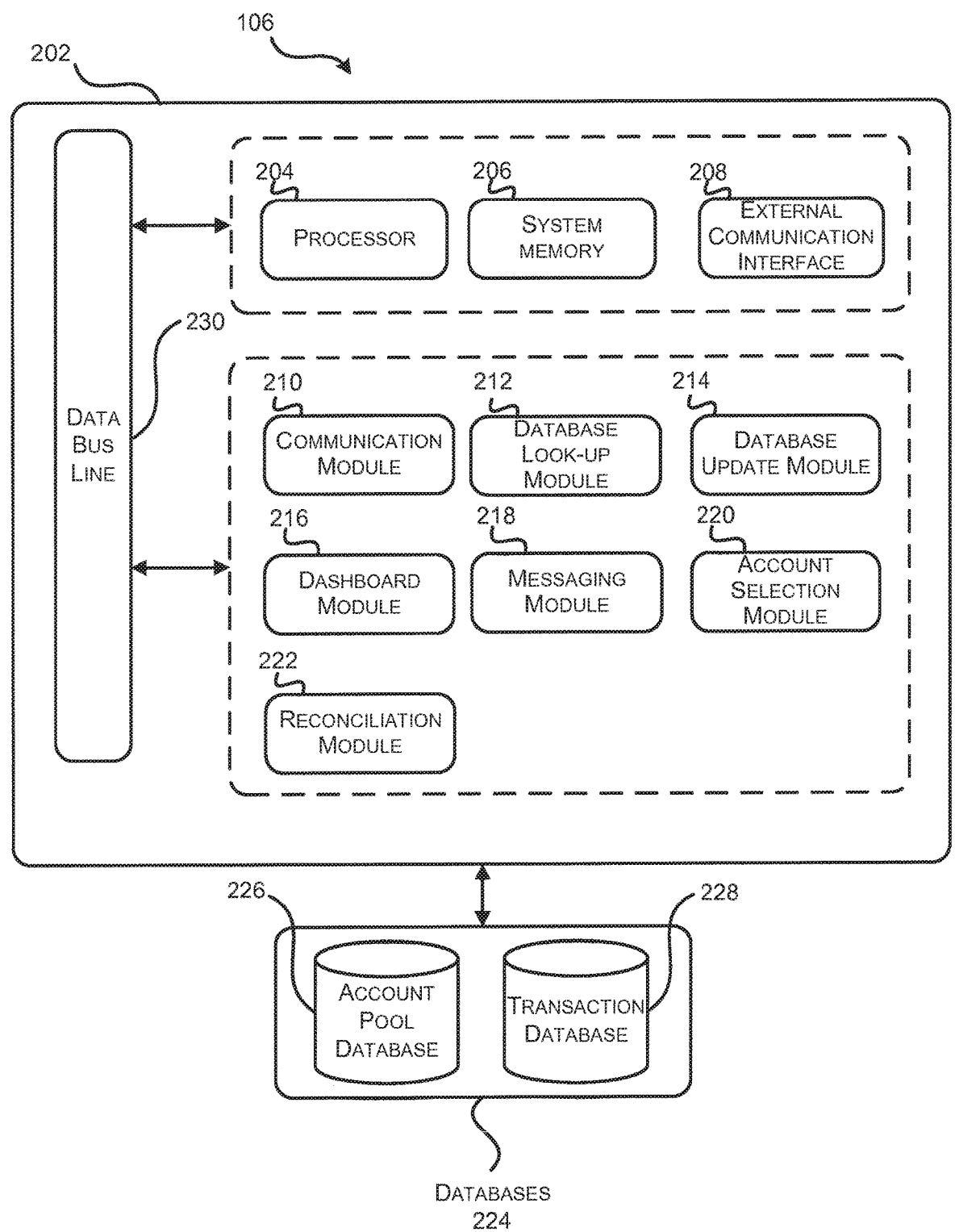
FIG. 2 illustrates a block diagram of an exemplary payables automation processor in accordance with some embodiments.

FIG. 2 illustrates a block diagram of an exemplary payables automation processor 106 in accordance with some embodiments. As seen in FIG. 2, payables automation processor 106 can include a server computer 202. Exemplary server computer 202 is illustrated as comprising a plurality of hardware and software modules (204-222). However, it should be appreciated that this is provided for illustration purposes only, and each of the modules and associated functionality may be provided and/or performed by the same or different components. That is, server computer 202 may, for instance, perform some of the relevant functions and steps described herein with reference to payables automation processor 106 through the use of any suitable combination of software instructions and/or hardware configurations. It should be noted that although FIG. 2 illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s).

Server computer 202 is shown as comprising a processor 204, system memory 206 (which may comprise any combination of volatile and/or non-volatile memory such as, for example, buffer memory, RAM, DRAM, ROM, flash, or any other suitable memory device), and an external communication interface 208. Moreover, one or more of modules 210-222 may be disposed within one or more of the components of system memory 206, or may be disposed externally. As was noted above, the software and hardware modules shown in FIG. 2 are provided for illustration purposes only, and the configurations are not intended to be limiting. Processor 204, system memory 206 and/or external communication interface 208 may be used in conjunction with any of the modules described below to provide a desired functionality. Some exemplary modules and related functionality may be as follows:

A communication module 210 may be programmed or configured to perform some or all of the functionality associated with receiving, sending, and generating electronic messages for transmission through system 100 to or from any of the entities shown in FIG. 1. When an electronic message is received by server computer 202 via external communication interface 208, it may be passed to communications module 210. A received electronic message can include, for example, registration information received from buyer 102, account information received from the issuer operating issuer computer 118 or received from buyer 102, reconciliation data received from payment processing network 116, and/or other information. Communications module 210 may identify and parse the relevant data based on a particular messaging protocol used in system 100. The received information may comprise, for instance, identification information, transaction information, and/or any other information that payables automation processor 202 may utilize in providing account pool processing. Communication module 210 may then transmit any received information to an appropriate module within server computer 202 (e.g., via a system bus line 230). Communication module 210 may also receive information from one or more of the modules in server computer 202 and generate an electronic message in an appropriate data format in conformance with a transmission protocol used in system 100 so that the message may be sent to one or more components within system 100 (e.g., to buyer computer 104, supplier computer 112, payment processing network 116, or other entity). The electronic message may then be passed to external communication interface 208 for transmission. The passed electronic message may include, for example, transaction information (e.g., account information, payment amount, etc.) for transmission to supplier computer 112, reconciliation information provided to buyer 102 (e.g., via a web-based dashboard), and/or other information.

A database look-up module 212 may be programmed or configured to perform some or all of the functionality associated with retrieving information from one or more databases 224. In this regard, database look-up module 212 may receive requests from one or more of the modules of server computer 202 for information that may be stored in one or more of databases 228. Database look-up module 212 may then determine and query an appropriate database.

A database update module 212 may be programmed or configured to provide some or all of the functionality associate with maintaining and updating databases 224, such as an account pool database 226 and a transaction database 228. In this regard, database update module 212 may receive information such as payment request messages received from buyer computer 104, account information transmitted to supplier computer 112, reconciliation data received from payment processing network 116, and other information from one or more of the modules described herein. Such information may then be stored in the appropriate location in databases 224 using any suitable storage process.

A dashboard module 216 may be programmed or configured to provide some or all of the functionality associated with providing an interface for buyers, suppliers, and other entities. In some embodiments, dashboard module 216 may provide a web-based interface. Dashboard module 216 may provide one or more interfaces for buyer 102 to register with payables automation processor 106, for buyer 102 and/or the issuer operating issuer computer 118 to provide account information, for the supplier operating supplier computer 112 to obtain transaction information (e.g., account information, payment amount, etc.), for buyer 102 to review reconciliation information and reports, and for providing any other suitable information to any of the entities in system 100. When a buyer registers with payables automation system 106 and account information for the buyer is uploaded, dashboard module 216 may store account pool data for the buyer in account pool database 226 using, for example, database update module 214. As described in further detail below with reference to FIG. 3, account pool data stored in account pool database 226 can include buyer IDs, value limits, account IDs, account availability indicators, and other information.

Returning to FIG. 2, a messaging module 218 may be programmed or configured to perform some or all of the functionality associated with analyzing formatted information received from communication module 210 and transmitting information to communication module 210 for formatting and transmission outside of payables automation processor 106 by way of external communication interface 208. For example, in some embodiments, when a payment request message is received from buyer computer 104, communication module 210 can reformat and pass the message to messaging module 218. Upon receipt, message module 218 can identify suppliers, payment amounts, and other information contained in the message that can be passed to an account selection module 220. When an account is selected by account selection module 220, account information can be transmitted from account selection module 220 to messaging module 218. A message including information for the transaction (e.g., account information, payment amount, etc.) can then be generated by messaging module 218 (or by communication module 210) and transmitted to supplier computer 112 using external communication interface 208. Messaging module 218 can also store a record in transaction database 228 (e.g., using database update module 214) including information about the received payment request message (e.g., supplier, payment amount, etc.), information about the transaction information sent to the supplier (e.g., time and date of transmission, supplier email address used, etc.), and any other suitable information.

Account selection module 220 may be programmed or configured to perform some or all of the functionality associated with account selection. For example, as described above, account selection module 220 may receive payment request information passed from messaging module 218. Upon identifying the buyer (e.g., buyer 102) and payment amount, account selection module 220 can query account pool database 226 using database look-up module 212 to select an account to use for the payment. As described herein, in some embodiments, account selection module 220 can select an account from a pool of accounts associated with the lowest value limit sufficient to cover the payment amount. If all of the buyer's accounts in this account pool are in use, account selection module 220 can select an account from the pool of accounts with the next highest value limit. When the account is selected, account information for the selected account can be passed from account selection module 220 to messaging module 218.

Reconciliation module 222 may be programmed or configured to perform some or all of the functionality associated with reconciling payments with received payment request messages. As described above, payment processing network 116 can transmit (e.g., periodically) reconciliation data to payables automation processor 106. This data can be received via external communication interface 208, reformatted by communication module 210, and then analyzed by reconciliation module 222. The reconciliation data can include, for example, indications of whether initiated transactions were approved (e.g., authorization codes), payment amounts for approved transactions, payment amounts for declined transactions, and other information. Reconciliation module 222 can compare the received reconciliation data with payment request records stored in transaction database 228. For example, reconciliation module 222 can use database look-up module 212 to determine whether a payment amount successfully received by the supplier matches the payment amount included in the payment request message originally received from buyer 102. Reconciliation module 222 may generate various reports regarding the buyer's transactions, and may provide such reports to dashboard module 216 for presenting to buyer 102. Reconciliation module 222 may also generate and transmit reports directly to buyer 102. For example, reconciliation module can transmit periodic reports to an email address of buyer 102 using external communication interface 208. In some embodiments, reconciliation module 222 may also store reconciliation information in transaction database 228 (e.g., using database update module 214) for future access and reporting purposes.

As described above, payables automation processor 106 may include one or more databases 224, such as account pool database 226 and transaction database 228. Each of the databases shown in this example may comprise more than one database, and may be located in the same location or at different locations. As described above, transaction database 228 can store data such as information about received payment request messages (e.g., suppliers, payment amounts, etc.), information about the transaction information sent to suppliers (e.g., time and date of transmission, supplier email address used, etc.), reconciliation information, and any other suitable data. As also described above, account pool database 226 can store account pool data for buyers. FIG. 3 illustrates an exemplary data table 300 containing account pool data in accordance with some embodiments.

As seen in FIG. 3, data table 300 can include a plurality of relational data fields including buyer ID fields 302(a), value limit fields 302(b), account ID fields 302(c), and availability fields 302(d). Buyer ID fields 302(a) can be populated by identifiers of registered buyers. Such identifiers can include, but are not limited to, an alphanumeric identifier, a buyer name, or the like. For a given buyer ID, the value limit fields 302(b) can be populated by value limits assigned to the buyer's account pools. In some embodiments, the value limits included in value limit fields 302(b)

can be credit limits. In some embodiments, the value limits included value limit fields 302(b) can be account balances (e.g., debit, prepaid, or gift card account balances). For each account pool, as shown in FIG. 3, account ID fields 302(c) can be populated by identifiers of the accounts included in account pool. Such identifiers can include PANs, account tokens, account names, or the like. Any suitable account types can be used including, but not limited to, credit card accounts, debit card accounts, prepaid card accounts, gift card accounts, and the like. In some embodiments, accounts included in account pools can be in the form of virtual accounts not associated with a physical payment card.

For each account in a given account pool, availability fields 302(d) can include identifiers indicating whether the account is currently being used to make a payment to a supplier or whether the account is available for use. As described herein, in some embodiments, accounts may only be used to make a payment to one supplier at a time. For example, a hold period may be assigned to one or more of the accounts. Once an account has been selected to make a payment to a supplier, the account can be unusable after the payment is completed until the hold period expires. Exemplary hold periods can include, but are not limited to, 30 days, 60 days, 90 days, 6 months, 1 year, and the like. Any suitable hold period can be assigned to accounts in accordance with various embodiments. In some other embodiments, accounts are only used once such that the account is unusable for any other future payments.

As described above, account pool data can be stored when a buyer registers and their accounts are uploaded to payables automation processor 106. For example, dashboard module 216 can use database update module 214 to populate buyer ID fields 302(a), value limit fields 302(b), and account ID fields 302(c) of data table 300. In some embodiments, availability data fields 302(d) are initially populated to reflect that a buyer's accounts are all available. As accounts are selected to pay a supplier, account selection module 220 can use database update module 214 to modify availability fields 302(d) to reflect that the account is not available (e.g., until an assigned hold period expires).

It should be understood that the arrangement and content of fields shown in data table 300 are provided only as an illustration. For example, data tables according to embodiments of the invention may include any suitable number of fields including fewer or more fields than that shown in data table 300 and/or different data fields altogether. Embodiments of the invention may alternatively include other arrangements of data different than the relational data fields illustrated in FIG. 3.

Returning to FIG. 2, server computer 202 is illustrated as being included in payables automation processor 106. This, however, is not intended to be limiting. In some embodiments, one or more of modules 204-222 and databases 224 can be included within any other suitable entity of system 100. For example, in some embodiments, one or more functionalities associated with payables automation processor 106 can be performed by payment processing network 116, issuer computer 118, acquirer computer 114, or other suitable entity.

II. Exemplary Methods

Figure 4:
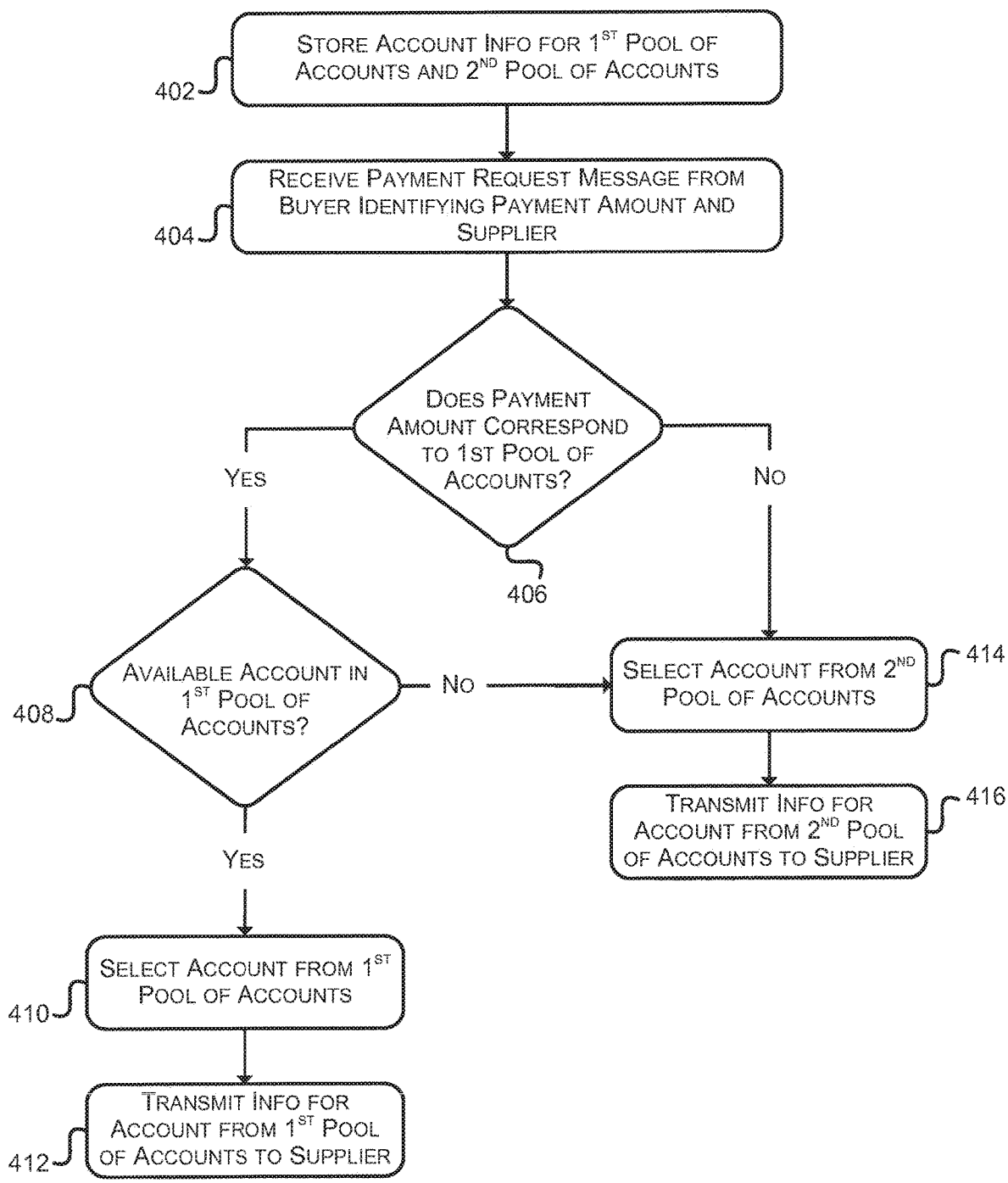
FIG. 4 illustrates a flowchart of an exemplary method of providing account pool processing in accordance with some embodiments.

FIG. 4 illustrates a flowchart of an exemplary method 400 of providing account pool processing in accordance with some embodiments. The steps of method 400 may be performed, for example, by server computer 202 of payables automation processor 106. In other embodiments, one or more steps of method 400 may be performed by any other suitable entity such as one or more of the entities of system 100 shown in FIG. 1. In some embodiments, one or more steps of method 400 may be performed by an entity not shown FIG. 1, such as a merchant processor, issuer processor, acquirer processor, or any other suitable entity.

In FIG. 4, at step 402, a server computer can store account information for a first pool of accounts and a second pool of accounts. In some embodiments, the first pool of accounts and the second pool of accounts can be issued by an issuer to a buyer. Thus, in some embodiments, the server computer can receive the account information for the first pool of accounts and the second pool of accounts from the issuer prior to storing the account information at step 402.

In some embodiments, accounts in the first and second pool of accounts can individually include a shared attribute. For example, the first pool of accounts can be associated with a first value limit, and the second pool of accounts can be associated with a second value limit, the second value limit being higher than the first value limit. Any suitable types of accounts can be included in the first and second pools of accounts. In some embodiments, the first pool of accounts and the second pool of accounts comprise virtual accounts.

At step 404, the server computer can receive a payment request message from the buyer that identifies a payment amount and a supplier. In some embodiments, the server computer can be configured to provide automated accounts payables processing, and the payment amount identified by the payment request message can correspond to a debt owed by the buyer to the supplier. In some embodiments, the payment request message can be in a "batch" format such that the payment request message identifies a plurality of suppliers of the buyer, each supplier being associated with an identified payment amount.

At decision 406, the server computer can determine whether the payment amount identified by the payment request message corresponds to the first pool of accounts or the second pool of accounts. In some embodiments, determining whether the payment amount corresponds to the first pool of accounts or the second pool of accounts includes comparing the payment amount to the value limits associated with the first and second pools of accounts. In some embodiments, comparing the payment amount to the value limits associated with the first and second pools of accounts includes determining whether the first value limit or the second value limit is the lowest value limit that is greater than the payment amount included in the payment request message.

If it is determined at decision 406 that the payment amount corresponds to the first pool of accounts, method 400 can proceed directly to step 410 in some embodiments. For example, the server computer may determine at decision 406 that the first pool of accounts is associated with the lowest value limit that is greater than the payment amount. At step 410, the server computer can select an account from the first pool of accounts and, at step 412, the server computer can transmit account information for the selected account in the first pool of accounts to the supplier. The account information can include, for example, an account number (e.g., a primary account number "PAN"), expiration date, CVV code, billing address information (e.g., a billing ZIP code), buyer name, buyer phone number, and/or the like. The payment amount included in the payment request message can also be transmitted with the account information for the selected account. In some embodiments, the account information (and payment amount) can be transmitted in the form of an electronic message (e.g., an email message)

including an embedded hyperlink that can be selected by the merchant to obtain the account information needed to initiate the transaction.

In some embodiments, the supplier can operate a supplier computer (e.g., supplier computer 112 of system 100) that receives the account information from the server computer. Upon receipt, the supplier can initiate the transaction by causing the supplier computer to generate and transmit an authorization request message to the issuer of the selected account via a payment processing network configured to process debit and credit card transactions. The authorization request message can include the account information for the selected account and the payment amount. In some embodiments, the supplier computer can receive an authorization response message from the issuer of the selected account via the payment processing network. The authorization response message can indicate whether the issuer authorizes a transfer of the payment amount from the selected account to the supplier. In some embodiments, the amount transferred can be less than the payment amount to fees applied by one or more of the participating entities. If the issuer authorizes the transaction, funds corresponding to the payment amount can be transferred from the issuer to the supplier as part of a clearing and settlement process as described above.

Returning to decision 406 of method 400, if it is alternatively determined by the server computer that the payment amount included in the payment request message is instead associated with the second pool of accounts, method 400 can proceed to step 414. For example, the server computer may determine at decision 406 that the first pool of accounts is associated with a value limit less than the payment amount but that the second pool of accounts is associated with the lowest value limit greater than the payment amount. At step 414, the server computer can select an account from the second pool of accounts and, at step 416, the server computer can transmit account information for the selected account in the second pool of accounts to the supplier. Further details regarding steps 414 and 416 are described above with reference to steps 410 and 412.

In some embodiments, an account pool may not contain an account available to make the payment to the supplier. As described above, accounts may be usable for making a payment to a single supplier at a time and may be subject to a hold period during which the account cannot be used for another transaction. Thus, referring back to decision 406, if it is determined that the payment amount corresponds to the first pool of accounts, method 400 can proceed to decision 408 instead of proceeding directly to step 410. At decision 408, the server computer can determine whether the first pool of accounts contains an account available for use. If an account is available in the first pool of accounts, method 400 can proceed to steps 410 and 412 described above where the server computer can select an account from the first pool of accounts and can transmit account information for the selected account in the first pool of accounts to the supplier. However, if it is determined at decision 408 that the first pool of accounts contains no available accounts, method 400 can proceed to steps 414 and 416. As described above, steps 414 and 416 can include the server computer instead selecting an account from the second pool of accounts and transmitting the account information for the account in the second pool of accounts to the supplier. In such embodiments, the second pool of accounts may be associated with the next highest value limit sufficient to cover the payment amount as compared to the value limits assigned to all of the buyer's remaining account pools.

Figure 5:
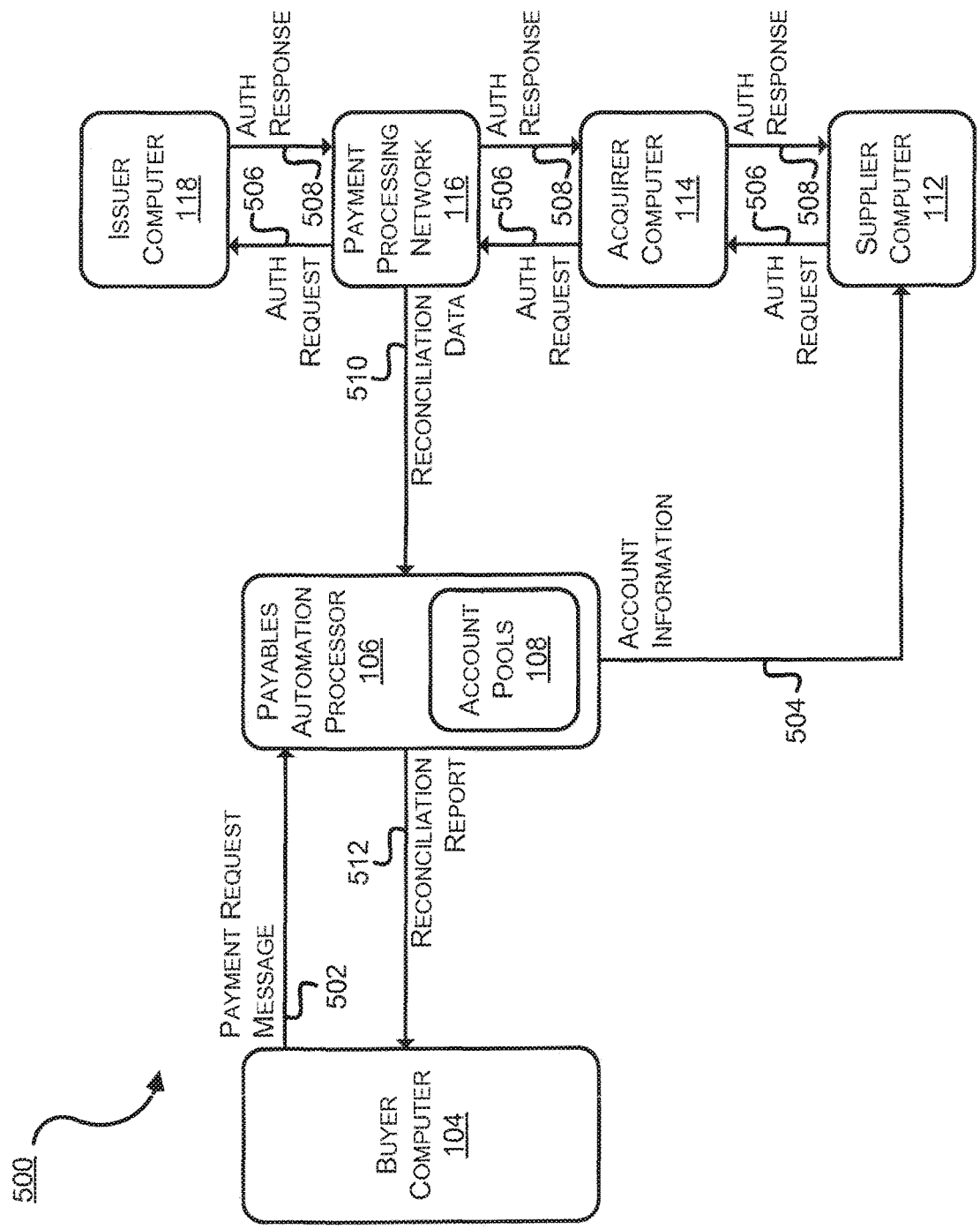
FIG. 5 illustrates a block diagram of an exemplary system and corresponding workflow for providing account pool processing in accordance with some embodiments.

FIG. 5 illustrates a block diagram of an exemplary system and corresponding workflow 500 for providing account pool processing in accordance with some embodiments. As illustrated in FIG. 5, the system may include components of system 100 shown in FIG. 1, such as buyer computer 104, payables automation processor 106 including (or otherwise having access to) account pools 108, supplier computer 112, acquirer computer 114, payment processing network 116, and issuer computer 118.

As a non-limiting illustration using the system and workflow 500 shown in FIG. 5, the buyer can use buyer computer 104 to transmit a payment request message 502 to payables automation processor 106. Payment request message 502 can include an identifier of the supplier operating supplier computer 112 (e.g., a supplier email address), a payment amount owed to the supplier (e.g., $300), a supplier invoice number, and other information. Based on the payment amount included payment request message 502, payables automation processor 106 can select an account from account pools 108 including accounts issued to the buyer. In this illustration, account pools can include a pool of accounts having a credit limit of $250, a pool of accounts having a credit limit of $500, a pool of accounts having a credit limit of $750, and a pool of accounts having a credit limit of $1,000.

Since the account pool associated with the $500 credit limit is the lowest credit limit sufficient to cover the purchase amount of $300, payables automation processor 106 can first determine if an account is available in this pool of accounts. If all accounts in the pool associated with the $500 credit limit are in use, payables automation processor 106 can determine whether the account pool with the next highest credit limit accounts, i.e. $750, includes an available account. In this illustration, payables automation processor 106 may determine that the account pool associated with the $750 credit limit is the lowest credit limit pool having an available account. Payment processor can then transmit account information 504 (e.g., a PAN, expiration date, CVV, and billing ZIP code) for the selected account along with the payment amount to supplier computer 112. In this illustration, this information is transmitted via the internet as an email message directed to the supplier email address included in payment request message 502 and including an embedded hyperlink.

Upon receiving the email message, the supplier operating supplier computer 112 can select the embedded hyperlink to obtain account information 504 from payables automation processor 106 (e.g., via a web interface). Supplier computer 112 can then generate an authorization request message 506 including account information 504 and the payment amount, and can transmit authorization request message 506 to acquirer computer 114. Acquirer computer 114 can then transmit authorization request message 506 to payment processing network 116 which can process and forward authorization request message 206 to issuer computer 118.

Issuer computer 118 can process authorization request message 118 and make an authorization decision regarding whether the electronic payment transaction is approved. An authorization response message 508 can be generated by issuer computer 118, and transmitted back to payment processing network 116. Authorization response message 508 can then be transmitted from payment processing network 116 to acquirer computer 114, which can then forward authorization response message 508 to supplier computer 112.

At the end of the day, if issuer computer 118 authorized the transaction, a clearing and settlement process can be performed by payment processing network 116, acquirer computer 114, and issuer computer 118, thereby allowing the transfer of funds associated with the transaction (e.g., the $300 payment amount reduced by fees) to be transferred from the issuer to an account of the supplier. The buyer may receive a statement from the issuer at a later date reflecting that the buyer owes the issuer an amount associated with the funds transferred to the supplier.

Additionally, payment processing network 116 can transmit reconciliation data 510 to payables automation processor 106. In this illustration, reconciliation data 510 can indicate that the supplier initiated a transaction for $300, that the transaction was approved, and that the funds associated with the transaction were paid to the supplier. Payables automation processor 106 can compare reconciliation data 510 to the payment amount and other information included in payment request message 502, and can generate a reconciliation report 512. In this illustration, reconciliation report 512 can be transmitted by payables automation processor 106 to buyer computer 104 via the internet in the form of an email message.

By comparing reconciliation data 510 to the information contained in payment request message 502, payables automation processor 106 and the buyer can be made aware of a supplier initiating a transaction for an amount larger than that authorized by the buyer. Moreover, by selecting an available account from a pool of accounts having the lowest credit limit sufficient to cover the payment amount, the potential losses associated with such fraudulent activities by suppliers can be reduced.

Account pool processing is described herein in an accounts payable context where a payment is made on behalf of a buyer that has incurred debt with a supplier. This, however, is not intended to be limiting as embodiments of the invention can also encompass other transactional contexts. For example, in some embodiments, account pool processing can be provided in the context of employee spending accounts. In such embodiments, an employer can register with the payables automation processor and virtual accounts issued to the employer can be uploaded. The employer can designate individual accounts in their account pools to specific employees, the accounts being usable for travel expenses, relocation expenses, and other costs the employer has agreed to pay. In some embodiments, the payables automation processor can provide the designated virtual account information directly to the employee or an employee spending administrator. Using the virtual account information, the employee can purchase, for example, airfare, a hotel stay, a rental car, and/or other travel-related purchases in an e-commerce, phone, or other card-not-present transaction.

After the employee's travel is complete, in some embodiments, the virtual account can be deactivated and assigned a hold period (e.g., 60 days) before the virtual account can be assigned to and used by another employee or by the same employee. The travel merchants receiving payments from the employee using the designated virtual account can initiate, authorize, clear, and settle the transactions as described above. Reconciliation reports can also be provided by the payables automation processor to the employer. Such reports may help identify potential fraud, and also keep track of employee expenses. The employer can also log into a web interface provided by the payables automation processor in which the employer can monitor employee spending using the employer's virtual accounts. If an employee travels regularly or has consecutive trips planned in a short period of time, the employer may configure a setting for the designated virtual account at the payables automation processor to allow the virtual account to be reused (e.g., up to certain amount, for a specified period of time, etc.). In some embodiments, virtual accounts can be configured to be reused by different employees over a period of time without being subject to a hold period.

Virtual accounts designated to employees can also be assigned specified credit limits, daily spending limits, and other controls. For example, controls can be put in place that prevent the employee from using the designated virtual account to conduct international transactions, transactions with specified categories of merchants, ATM withdrawals, e-commerce and phone transactions, transactions during specified times of day, and the like.

III. Exemplary Computer Apparatus

The various participants and elements described herein with reference to FIGS. 1-5 may operate one or more computer apparatus to facilitate the functions described herein. Any of the elements in FIGS. 1-5 may use any suitable number of subsystems to facilitate the functions described herein.

Figure 6:
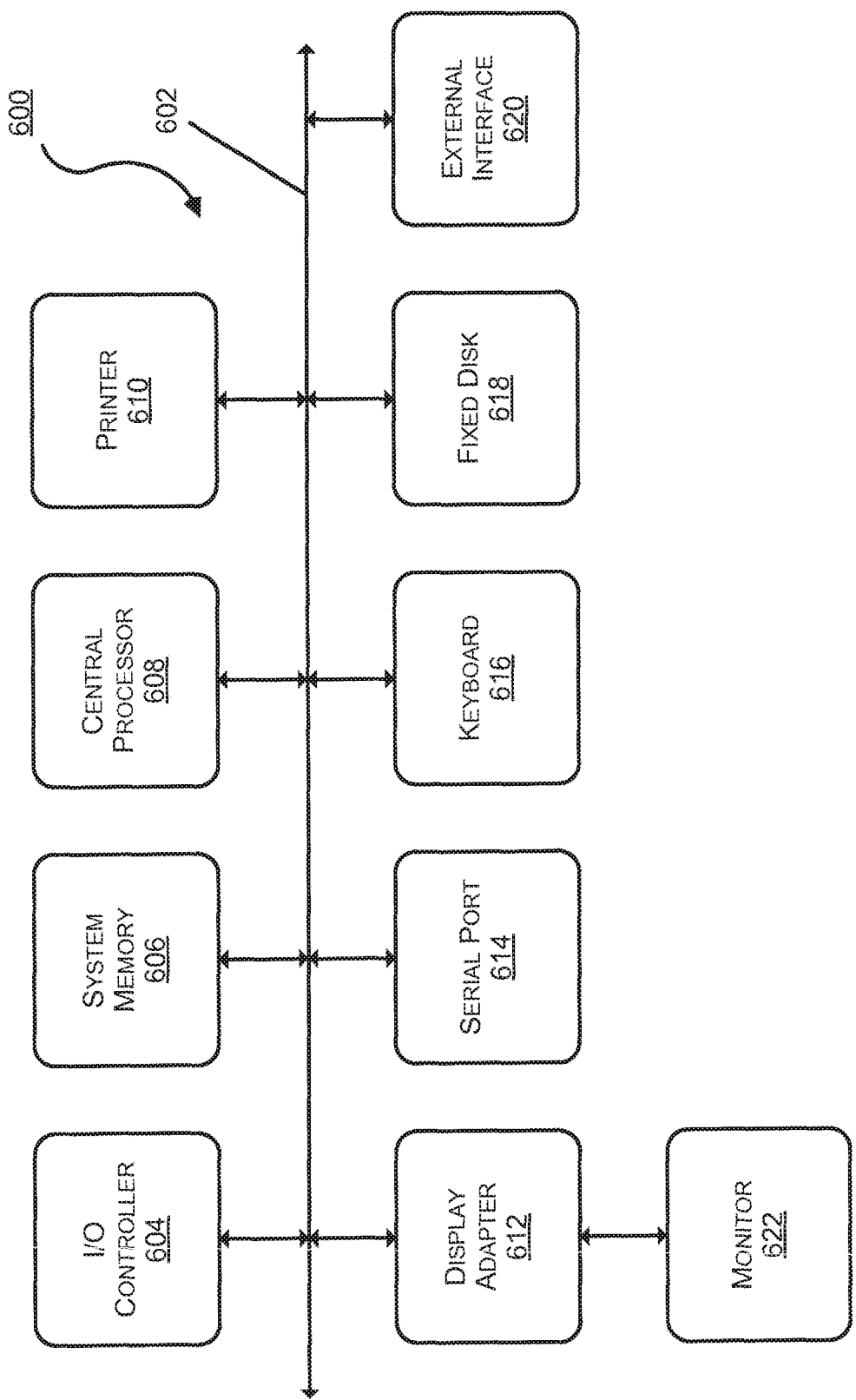
FIG. 6 illustrates a block diagram of an exemplary computer apparatus in accordance with some embodiments.

Examples of such subsystems or components are shown in FIG. 6 which illustrates exemplary computer apparatus 600. The subsystems shown in FIG. 6 are interconnected via a system bus 602. Additional subsystems such as a printer 610, keyboard 616, fixed disk 618 (or other memory comprising computer readable media), monitor 622, which is coupled to a display adapter 612, and others are shown. Peripherals and input/output (I/O) devices, which couple to I/O controller 604 (which can be a processor or other suitable controller), can be connected to the computer system by any number of means known in the art, such as a serial port 614. For instance, serial port 614 or an external interface 620 can be used to connect computer apparatus 600 to a wide area network such as the Internet, a mouse input device, or a scanner. The interconnection via system bus 602 allows a central processor 608 to communicate with each subsystem and to control the execution of instructions from a system memory 606 or fixed disk 618, as well as the exchange of information between subsystems. System memory 606 and/or fixed disk 618 may embody a computer readable medium (e.g., a non-transitory computer readable medium).

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
    aggregating, by a server computer, a plurality of accounts associated with an entity to generate a plurality of account pools based on respective value limits of the plurality of accounts, wherein the plurality of account pools comprise a first account pool that is associated with a first value limit and a second account pool that is associated with a second value limit that is greater than the first value limit;
    receiving, by the server computer, a request message from the entity that identifies an amount and a supplier;
    selecting, by the server computer, an account pool from the first account pool and the second account pool based at least in part on the amount, the first value limit associated with the first account pool, and the second value limit associated with the second account pool;
    selecting, by the server computer, an account from the selected account pool; and
    transmitting, by the server computer, account information for the selected account to the supplier.

2. The computer-implemented method of claim 1, further comprising:
    selecting, by the server computer, the first account pool based on the amount being less than the first value limit and closer to the first value limit than the second value limit.

3. The computer-implemented method of claim 1, further comprising:
    determining, by the server computer, that the amount is less than the first value limit; and
    determining, by the server computer, that at least one account of the first account pool is available, wherein selecting the first account pool is further based at least in part on the amount being less than the first value limit and the at least one account being available.

4. The computer-implemented method of claim 1, further comprising:
    determining, by the server computer, that the amount is less than the first value limit;
    determining, by the server computer, that no accounts of the first account pool are available; and
    selecting, by the server computer, the second account pool based at least in part on determining that no account of the first account pool are available.

5. The computer-implemented method of claim 1, further comprising:
    comparing, by the server computer, the amount to the first value limit and the second value limit to determine a lowest value limit that is greater than the amount, wherein the first account pool is selected when the first value limit is the lowest value limit that is greater than the amount, and wherein the second account pool is selected when the second value limit is the lowest value limit that is greater than the amount.

6. The computer-implemented method of claim 1, wherein the first account pool and the second account pool comprise virtual accounts.

7. The computer-implemented method of claim 1, wherein the server computer is configured to provide automated accounts payables processing, and wherein the amount corresponds to a debt owed by the entity to the supplier.

8. The computer-implemented method of claim 1, wherein the plurality of accounts are issued by an issuer to the entity.

9. The computer-implemented method of claim 1, further comprising:
    receiving, by the server computer, the account information for the plurality of accounts; and
    storing, by the server computer, the account information.

10. A server computer comprising:
    a processor; and
    a non-transitory computer-readable medium coupled to the processor, the non-transitory computer-readable medium including code executable by the processor for performing a method comprising:
    aggregating a plurality of accounts associated with an entity to generate a plurality of account pools based on respective value limits of the plurality of accounts, wherein the plurality of account pools comprise a first account pool that is associated with a first value limit and a second account pool that is associated with a second value limit that is greater than the first value limit;
    receiving a request message from the entity that identifies an amount and a supplier;
    selecting an account pool from the first account pool and the second account pool based at least in part on the amount, the first value limit associated with the first account pool, and the second value limit associated with the second account pool;
    selecting an account from the selected account pool; and
    transmitting account information for the selected account to the supplier.

11. The server computer of claim 10, wherein the method further comprises:
    selecting the first account pool based on the amount being less than the first value limit and closer to the first value limit than the second value limit.

12. The server computer of claim 10, wherein the method further comprises:
    determining that the amount is less than the first value limit; and
    determining that at least one account of the first account pool is available, wherein selecting the first account pool is further based at least in part on the amount being less than the first value limit and the at least one account being available.

13. The server computer of claim 10, wherein the method further comprises:
    determining that the amount is less than the first value limit;
    determining that no accounts of the first account pool are available; and
    selecting, by the server computer, the second account pool based at least in part on determining that no account of the first account pool are available.

14. The server computer of claim 10, wherein the method further comprises:

comparing the amount to the first value limit and the second value limit to determine a lowest value limit that is greater than the amount, wherein the first account pool is selected when the first value limit is the lowest value limit that is greater than the amount, and wherein the second account pool is selected when the second value limit is the lowest value limit that is greater than the amount.

15. The server computer of claim 10, wherein the first account pool and the second account pool comprise virtual accounts.

16. The server computer of claim 10, wherein the server computer is configured to provide automated accounts payables processing, and wherein the amount corresponds to a debt owed by the entity to the supplier.

17. The server computer of claim 10, wherein the plurality of accounts are issued by an issuer to the entity.

18. The server computer of claim 10, wherein the method further comprises:
receiving, by the server computer, the account information for the plurality of accounts; and
storing, by the server computer, the account information.

19. A computer-implemented method comprising:
transmitting, by a client computer to a server computer, a request message associated with an entity, the request message comprising an amount and a supplier identifier associated with a supplier, wherein receipt of the request message by the server computer causes the server computer to select an account from a plurality of account pools associated with the entity, each account of an account pool sharing a common value limit, the account being selected based on the amount and respective value limits of the plurality of account pools;
transmitting, by the server computer, account information for the selected account to a supplier computer associated with the supplier identifier, wherein transmitting the account information causes the supplier computer to initiate a transaction utilizing the account information; and
receiving, by the client computer from the server computer, a reconciliation report generated by the server computer, the reconciliation report indicating that the supplier initiated a transaction corresponding to the request message utilizing the account information.

20. A computer-implemented method of claim 19, wherein the server computer aggregates a plurality of accounts associated with the entity to generate the plurality of account pools based on respective value limits of the plurality of accounts, wherein the plurality of account pools comprise a first account pool that is associated with a first value limit and a second account pool that is associated with a second value limit that is greater than the first value limit, and wherein the server computer selects the account from the plurality of account pools based on the first value limit associated with the first account pool, the second value limit associated with the second account pool, and the amount included in the request message.

* * * * *